United States Patent
Matsui et al.

(10) Patent No.: US 12,304,565 B2
(45) Date of Patent: May 20, 2025

(54) ROCKER COMPONENT WITH TAPERED SHAPE

(71) Applicant: Shape Corp., Grand Haven, MI (US)

(72) Inventors: Takashi Matsui, Toyota (JP);
Kazutoyo Fujikawa, Atsugi (JP);
Matthew Kuipers, Holland, MI (US);
Zehua Qin, Norton Shores, MI (US)

(73) Assignee: Shape Corp., Grand Haven, MI (US)

( * ) Notice: Subject to any disclaimer, the term of this patent is extended or adjusted under 35 U.S.C. 154(b) by 206 days.

(21) Appl. No.: 17/868,410

(22) Filed: Jul. 19, 2022

(65) Prior Publication Data

US 2023/0016200 A1 Jan. 19, 2023

Related U.S. Application Data

(60) Provisional application No. 63/223,498, filed on Jul. 19, 2021.

(51) Int. Cl.
*B62D 25/02* (2006.01)
*B62D 21/15* (2006.01)

(52) U.S. Cl.
CPC ......... *B62D 25/025* (2013.01); *B62D 21/157* (2013.01)

(58) Field of Classification Search
CPC .... B62D 25/025; B62D 21/157; B62D 25/04; B62D 27/023
USPC ................. 296/209, 187.12, 29, 30
See application file for complete search history.

(56) References Cited

U.S. PATENT DOCUMENTS

| | | | |
|---|---|---|---|
| 10,464,406 B2* | 11/2019 | Kawabe | B60K 1/04 |
| 11,370,287 B2* | 6/2022 | Tsuyuzaki | B62D 21/157 |
| 2002/0043821 A1 | 4/2002 | Takashina et al. | |
| 2018/0370573 A1 | 12/2018 | Yang et al. | |
| 2020/0114972 A1 | 4/2020 | Lee et al. | |

FOREIGN PATENT DOCUMENTS

| | | |
|---|---|---|
| JP | H0467190 U | 6/1992 |
| JP | 2006264476 A | 10/2006 |
| JP | 2008213826 A | 9/2008 |
| JP | 2020083033 A | 6/2020 |
| WO | 2020136265 A1 | 7/2020 |

OTHER PUBLICATIONS

International Search Report for PCT/US2022/073885, mailed Nov. 11, 2022; 4 pp.

* cited by examiner

*Primary Examiner* — Dennis H Pedder
(74) *Attorney, Agent, or Firm* — Bodman PLC

(57) ABSTRACT

A rocker component for a vehicle includes a tubular beam having a transverse cross-sectional shape extending continuously along a length of the tubular beam. The transverse cross-sectional shape of the tubular beam includes an inboard portion that has an inboard height dimension and an outboard portion that has an outboard height dimension. The outboard height dimension is less than the inboard height dimension. The transverse cross-sectional shape of the tubular beam also includes an upper planar wall and a lower planar wall that connect linearly between the respective upper and lower ends of the inboard portion and the outboard portion to form a tapered shape.

17 Claims, 6 Drawing Sheets

ROCKER COMPONENT WITH TAPERED SHAPE

CROSS-REFERENCE TO RELATED APPLICATION

This application claims benefit and priority under 35 U.S.C. § 119(e) to U.S. Provisional Patent Application No. 63/223,498, filed Jul. 19, 2021, the contents of this prior application is considered part of this application and is hereby incorporated by reference in its entirety.

TECHNICAL FIELD

The present disclosure relates to rocker and sill assemblies for vehicle body structures, and more particularly to rockers and reinforcement inserts for rocker and sill assemblies, sub-assemblies, and the like.

BACKGROUND

Vehicle frames and body structures are designed to support the vehicle and undergo and absorb certain levels of impact forces, such as to prevent distances of inboard intrusion into the vehicle in accordance with insurance requirements and other regulatory and legal requirements. Side impacts to a vehicle are commonly tested with side pole impact testing, which direct significant side impact forces to the vehicle. Vehicle frames primarily absorb these side impacts at the rocker sections that run longitudinally between the front and rear wheels along the lower outboard portions of the vehicle frame.

With the incorporation of battery trays in electric and hybrid electric vehicles in the lateral inboard area between opposing rocker sections, it is desirable for the side impact intrusion distance to be reduced in order to maximize available battery storage volume in the battery trays. For example, it is generally known to increase stiffness of a rocker section to reduce the inboard distance of a side impact intrusion, such as by adding internal reinforcements to a rocker section.

SUMMARY

The present disclosure provides a rocker component, which may refer to a rocker still and/or a rocker insert. The rocker component disclosed herein has a tapered shape that is designed to optimize at least two load paths that originate from a concentrated area at the outboard side of the rocker and radiate or diverge over an increased height of the rocker component as the load paths extend inboard. The inboard and outboard walls of the rocker component, along with the tapered walls that carry the load paths, may form a trapezoidal cross-sectional shape. Such a tapered rocker component provides an effective solution for energy absorption performance, while offering massing savings over conventional square or rectangular designs.

One aspect of the disclosure provides a rocker component that has a tubular beam with a transverse cross-sectional shape that extends continuously along a length of the tubular beam. The transverse cross-sectional shape of the tubular beam includes an inboard portion having an inboard height dimension and an outboard portion having an outboard height dimension that is less than the inboard height dimension. The transverse cross-sectional shape of the tubular beam comprises an upper planar wall and a lower planar wall that connect linearly between the respective upper and lower ends of the inboard portion and the outboard portion to form a tapered shape.

In some implementations, the inboard portion includes an inner wall and the outboard portion comprises and outer wall, such that the inner and outer walls may integrally connect between the upper and lower planar walls. In some examples, the inner and outer walls and the upper and lower planar walls together surround at least one tubular section that extends along the length of the tubular beam. The inner wall, in some implementations, includes a planar section that is disposed at a transition angle relative to the upper and lower planar walls, such as 45 to 90 degrees. In some examples, the tubular beam includes a common center wall that extends between the upper and lower planar walls and divides an interior volume of the tubular beam to form at least two tubular sections.

Implementations of the disclosure may include one or more of the following optional features. In some implementations, the rocker component includes a sill inner and a sill outer that attaches along the sill inner. The tubular beam may then be disposed in an open volume between the sill inner and the sill outer with the outboard portion of the tubular beam facing the sill outer. For example, the tubular beam may be fixedly attached to sill inner or still outer directly or indirectly with a bracket.

In some implementations, the tubular beam is formed from a metal sheet that is bent or otherwise deformed to have at least one closed tubular section extending along the length of the tubular beam. In some examples, the tubular beam has a pair of adjacent tubular members that have hollow openings that are divided by a common center wall of the tubular beam. In some instances, the pair of adjacent tubular members are disposed laterally adjacent to each other. The metal sheet may be a martensitic steel with a tensile strength of at least 980 MPa, such as at least 1,500 MPa.

In some implementations, the inboard portion includes an inner wall and the outboard portion includes and outer wall, where the inner and outer walls integrally connect between the upper and lower walls. In some examples the tubular beam comprises an extrusion. Further, in some instance, the tubular beam includes a steel sheet, an aluminum sheet, a steel extrusion, an aluminum extrusion, or a fiber composite material.

Another aspect of the disclosure provides a rocker insert that has a tubular beam with a transverse cross-sectional shape extending continuously along a length of the tubular beam. The transverse cross-sectional shape of the tubular beam includes an inboard portion that has an inboard height dimension and an outboard portion has an outboard height dimension that is less than the inboard height dimension. The transverse cross-sectional shape of the tubular beam includes an upper wall and a lower wall that connect between the respective upper and lower ends of the inboard portion and the outboard portion to form a tapered shape.

In some implementations, the inboard portion includes an inner wall and the outboard portion comprises and outer wall, such that the inner and outer walls integrally connect between the upper and lower walls. The upper and lower walls may each include a planar section that is angled toward the outboard portion. In some examples, the inner and outer walls and the upper and lower planar walls together surround at least one tubular section that extends along the length of the tubular beam. The tapered shape, in some implementations, may further be defined by the planar sections of the upper and lower walls being disposed at a transition angle of 45 to 90 degrees relative to the inner wall.

In some implementations, the tubular beam has a common center wall that integrally connects with and extends between the upper and lower walls. The tubular beam, in some examples, may provide a metal sheet that is formed to have a pair of adjacent tubular members that have hollow openings that are divided by a common center wall of the tubular beam. The metal sheet may be a martensitic steel with a tensile strength of at least 1,500 MPa.

In yet another aspect of the disclosure, a rocker component for a vehicle includes a sill inner, a sill outer coupled along the sill inner, and a tubular beam that is disposed in an open volume between the sill inner and the sill outer. The tubular beam includes a transverse cross-sectional shape extending continuously along a length of the tubular beam. The transverse cross-sectional shape of the tubular beam comprises an inboard portion having an inboard height dimension and an outboard portion having an outboard height dimension that is less than the inboard height dimension. The transverse cross-sectional shape of the tubular beam comprises an upper planar wall and a lower planar wall that extend linearly between the respective upper and lower ends of the inboard portion and the outboard portion to form a tapered shape. The transverse cross-sectional shape comprises inner and outer walls and the upper and lower planar walls together surround at least one tubular section that extends along the length of the tubular beam. The tubular beam may include a common center wall that extends between the upper and lower planar walls and divides an interior volume of the tubular beam to form at least two tubular sections.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference numerals indicate like parts throughout the drawings.

DETAILED DESCRIPTION

Figure 1:
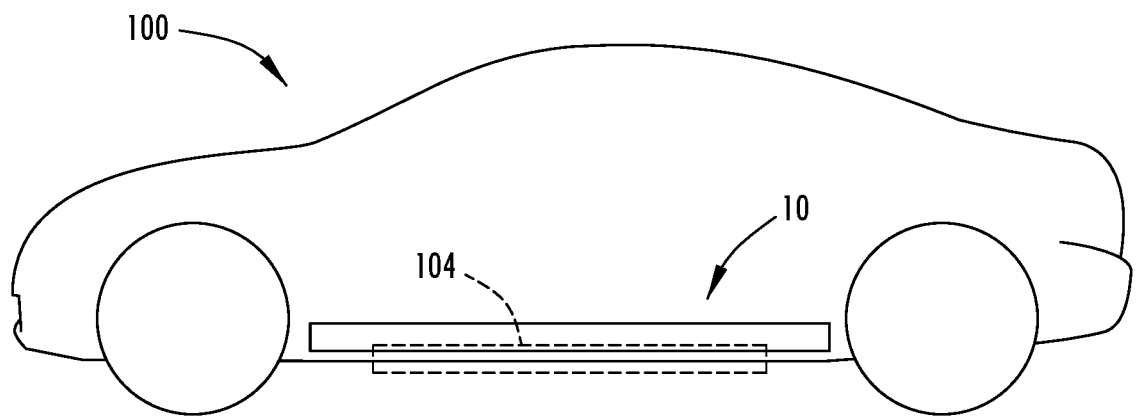
FIG. 1 is a side elevation view of a vehicle schematically showing a rocker assembly.
Figure 2:
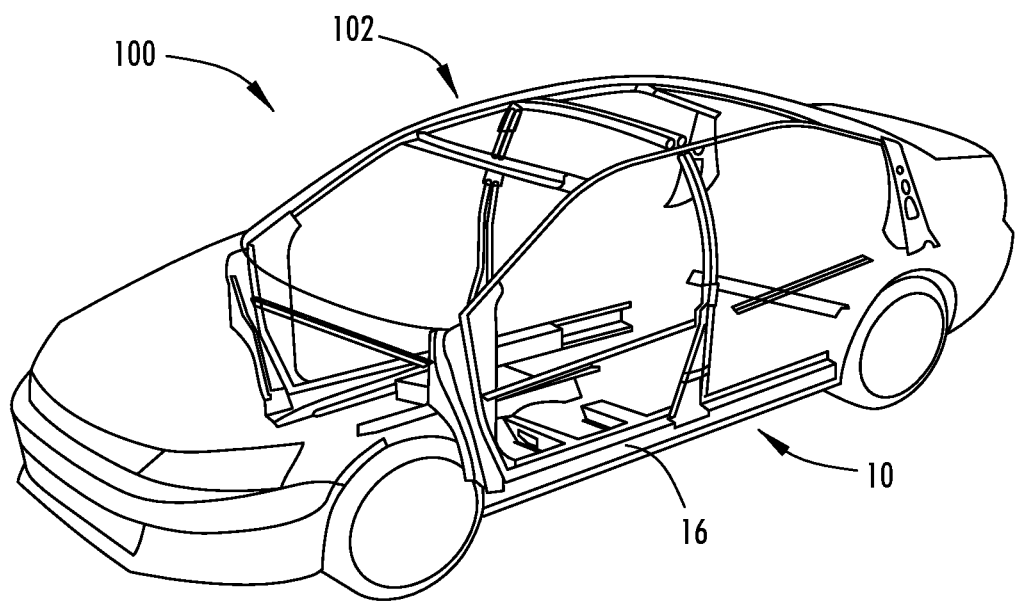
FIG. 2 is an upper perspective view of a vehicle showing a rocker assembly and other structural components.

Referring now to the drawings and the illustrative embodiments depicted therein, a rocker assembly 10 is provided for a body structure or frame 102 of a vehicle 100, such as shown in FIGS. 1 and 2. The vehicle frame and associated rocker assembly may have various designs and configurations, such as for different styles and types of vehicles. As shown for example in FIG. 1, the vehicle 100 may at least partially operate a propulsion system of the vehicle with a battery, such as a traction battery or battery modules, that may be supported in a battery tray 104 that is generally located between the front and rear wheels and near the floor of the vehicle 100. The vehicle battery tray may be attached to inboard portions of the rocker assembly to at least partially support and secure the battery tray to the vehicle frame. As also shown for example in FIG. 2, the vehicle 100 may not include a battery tray mounted between the rocker assemblies. In such an example, the frame 102 may provide a rocker assembles 10 that support the A-pillars, B-pillars, and cross members or the like. The vehicle for purposes of the disclosure may be any type of land motor vehicle, such as a car, truck, bus, van, sport utility vehicle, or the like, including those used for passenger travel, cargo shipping, or any other personal, governmental, or commercial purposes.

Figure 3:
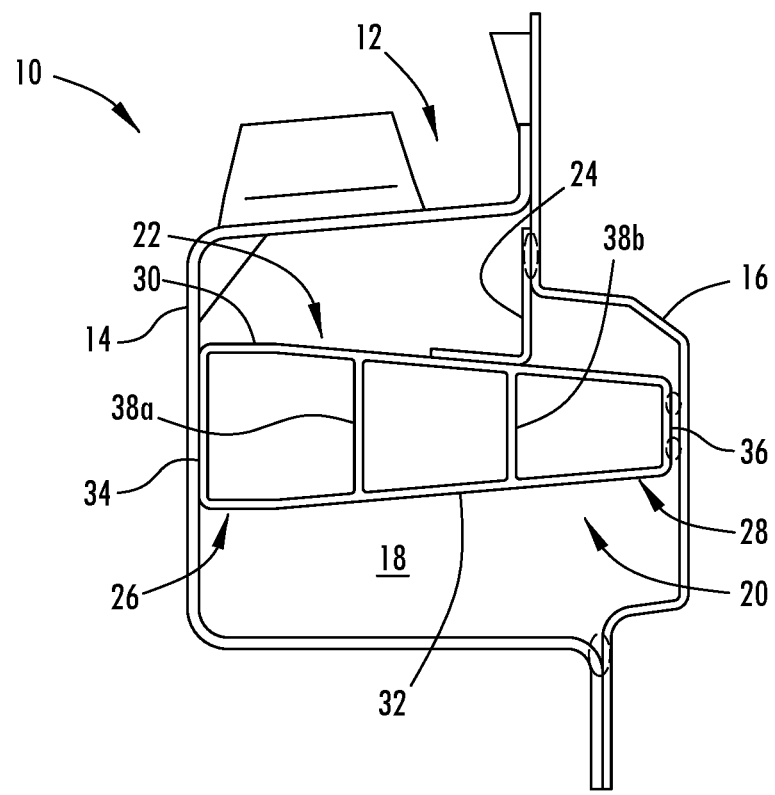
FIG. 3 is a cross-sectional view of an example of a rocker assembly.
Figure 4:
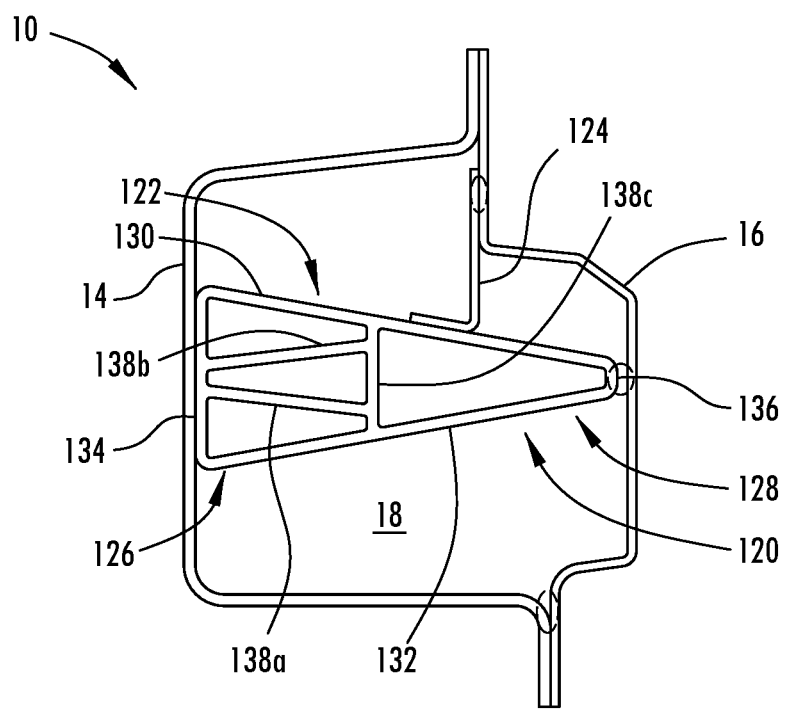
FIG. 4 is a cross-sectional view of another example of a rocker assembly.

The vehicle rocker assembly 10, as shown for example in FIGS. 3 and 4, includes a hollow external structure 12 that is formed with an inner sill member 14 and an outer sill member 16, which can also be referred to as a rocker panel or section. The inner sill member 14 is attached longitudinally along the outer sill member 16 to define an elongated hollow space 18 between the inner and outer sill members 14, 16. The inner and outer sill members 14, 16 that form the external structure 12 surround the elongated hollow space 18 between the inner and outer sill members 14, 16. A rocker insert 20 is disposed in the hollow space 18 of the external rocker structure 12 and extends longitudinally along at least a portion or longitudinal section of the hollow space 18. The rocker insert 20 has a cross-sectional shape or profile that is generally consistent along the length of the insert 20. The rocker insert 20 may comprise a tubular shape with one or more enclosed tubular sections. As such, the rocker insert 20 may be referred to as a rocker reinforcement beam or in some examples as a sill assembly insert.

The rocker insert 20, as illustrated in FIG. 3, includes a tubular beam 22 and at least one mounting bracket 24 that secures the tubular beam 22 in the hollow space 18 between the inner and outer sill members 14, 16. The tubular beam 22 has a transverse cross-sectional shape that extends continuously along a length of the tubular beam 22. In the illustrated example, the length of the tubular beam 22 corresponds to the length of the hollow space 18 between the inner and outer sill members 14, 16. In additional examples, the length of the tubular beam and/or the consistent cross-sectional shape may extend beyond or within a segment of the external structure provided by the assembled sill members.

As shown in FIG. 3, the transverse cross-sectional shape of the tubular beam 22 includes an inboard portion 26 that has an inboard height dimension and an outboard portion 28 that has an outboard height dimension, where the height dimensions are vertical dimensions relative to the vehicle as shown in FIGS. 1 and 2. In some examples, such as shown in FIG. 3, the outboard height dimension of the tubular beam 22 is less than the inboard height dimension, such as at least 20% less or at least 40% less. The transverse cross-sectional shape of the tubular beam 22 also includes an upper planar wall 30 and a lower planar wall 32 that connect linearly between the respective upper and lower ends of the inboard portion 26 and the outboard portion 28 to form a tapered shape. At the outboard edges of the upper and lower walls 30, 32, the outboard height dimension forms a narrow area between the upper and lower walls 30, 32 that receives impact loads imparted to the outer sill member 16 in a concentrated space. The resulting impact energy transfers laterally inboard along generally linear load paths on the upper and lower walls 30, 32.

As shown in FIG. 3, the inboard end wall 34 and the outboard end wall 36 are each substantially planar vertical walls that integrally interconnect with the upper and lower walls 30, 32 at the corners of the tubular beam 22. As such, the upper and lower walls 30, 32 together with the inboard end wall 34 and the outboard end wall 36 form a trapezoidal shape. The tubular beam 22 also includes intermediate walls 38a, 38b that extend continuously along the hollow interior of the tubular beam 22. The intermediate walls 38a, 38b shown in FIG. 3 extend vertically and integrally interconnect between the upper and lower walls 30, 32, dividing the hollow interior into separate hollow tubular interiors, such as to provide the tubular beam as a multi-tubular structure. The multi-tubular structure shown in FIG. 3 positions the divided hollow areas laterally adjacent to each other, so as to substantially span laterally between the interior surfaces of the inner and outer sill members 14, 16. In some examples, the end walls 34, 36 may be attached to the interior surfaces of the tubular beam 22, such as to attach and suspend the tubular beam in the hollow interior thereof.

As further shown in FIG. 3, the rocker insert 20 includes a bracket 24 for fixedly attaching the tubular beam to the exterior structure 12 of the rocker assembly 10. The bracket 24 includes a first portion that is fixed to the tubular beam, such as with welding, adhesive, fasteners, or the like. The bracket 24 extends from the attachment to provide a second portion that attaches to at least one of the inner or outer sill members 14, 16, such as to one of the flanges or between the flanges of the inner or outer sill members. As shown in FIG. 3, the upper portion of the bracket 24 fixed with welding to the upper flange of the outboard sill member 16. In additional examples it is contemplated that more or alternative brackets may be used to secure the tubular member of the rocker insert in the rocker assembly. Further, the inner and outer sill members may have different shapes and configurations from those illustrated herein, as different vehicles and vehicle types may have alternative sill member designs.

The rocker component and portions thereof may include one or multiple materials and be manufactured with various different types of processes. As shown for example in FIG. 3, the tubular beam of the rocker insert is an extrusion, which may be made with an aluminum alloy or a steel alloy. Further, in some instance, the tubular beam includes a steel sheet, an aluminum sheet, a steel extrusion, an aluminum extrusion, or a fiber composite material, such as a pultruded carbon fiber resinous composite. In some implementations, the tubular beam is formed from a metal sheet that is bent or otherwise deformed to have at least one closed tubular section extending along the length of the tubular beam. For example, the metal sheet may be roll formed or stamped. The metal sheet may be a martensitic steel with a tensile strength of at least 980 MPa, such as at least 1,500 MPa.

Referring now to FIG. 4, the rocker insert 120 includes a tubular beam 122 and at least one mounting bracket 124 that secures the tubular beam 122 in the hollow space 18 between the inner and outer sill members 14, 16. The tubular beam 122 has a transverse cross-sectional shape that extends continuously along a length of the tubular beam 122. In the illustrated example, the length of the tubular beam 122 corresponds to the length of the hollow space 18 between the inner and outer sill members 14, 16. In additional examples, the length of the tubular beam and/or the consistent cross-sectional shape may extend beyond or within a segment of the external structure provided by the assembled sill members.

As shown in FIG. 4, the transverse cross-sectional shape of the tubular beam 122 includes an inboard portion 126 that has an inboard height dimension and an outboard portion 128 that is tapered to a pointed shape. The cross-sectional shape of the tubular beam 122 also includes an upper planar wall 130 and a lower planar wall 132 that connect linearly between the respective upper and lower ends of the inboard portion 126 and the outboard portion 128 to form a tapered shape. At the outboard edges of the upper and lower walls 130, 132, the outboard height dimension forms a narrow area, shown as a pointed shape, between the upper and lower walls 130, 132 that receives impact loads imparted to the outer sill member 16 in a concentrated space. The resulting impact energy transfers laterally inboard along generally linear load paths on the upper and lower walls 130, 132.

As shown in FIG. 4, the inboard end wall 134 and the outboard end wall 136 are each substantially planar vertical walls that integrally interconnect with the upper and lower walls 130, 132 at the corners of the tubular beam 122. As such, the upper and lower walls 130, 132 together with the inboard end wall 134 and the outboard end wall 136 form a trapezoidal shape that has a relatively smaller outboard end wall 136, so as to resemble a triangular shape. The outboard end wall 136 is welded to the outer sill member 16, such as with a continuous bead or an intermediate spot weld. The tubular beam 122 also includes intermediate walls 138a, 138b, 138c that extend continuously along the hollow interior of the tubular beam 122. The intermediate walls 138a, 138b are substantially horizontal, while the intermediate wall 138c extends vertically and integrally interconnect between the upper and lower walls 130, 132. The intermediate walls 138a, 138b, 138c divide the hollow interior into separate hollow tubular interiors, such as to provide the tubular beam as a multi-tubular structure. The multi-tubular structure shown in FIG. 4 positions the divided hollow areas laterally adjacent to each other, so as to substantially span laterally between the interior surfaces of the inner and outer sill members 14, 16. In some examples, the end walls 34, 36 may be attached to the interior surfaces of the tubular beam 22, such as to attach and suspend the tubular beam in the hollow interior thereof.

As further shown in FIG. 4, the rocker insert 120 includes a bracket 124 for fixedly attaching the tubular beam to the exterior structure 12 of the rocker assembly 10. The bracket 124 includes a first portion that is fixed to the tubular beam, such as with welding, adhesive, fasteners, or the like. The bracket 124 extends from the attachment to provide a second portion that attaches to at least one of the inner or outer sill members 14, 16, such as to one of the flanges or between the flanges of the inner or outer sill members. As shown in FIG. 4, the upper portion of the bracket 124 is fixed with welding to the upper flange of the outboard sill member 16.

Figure 5:
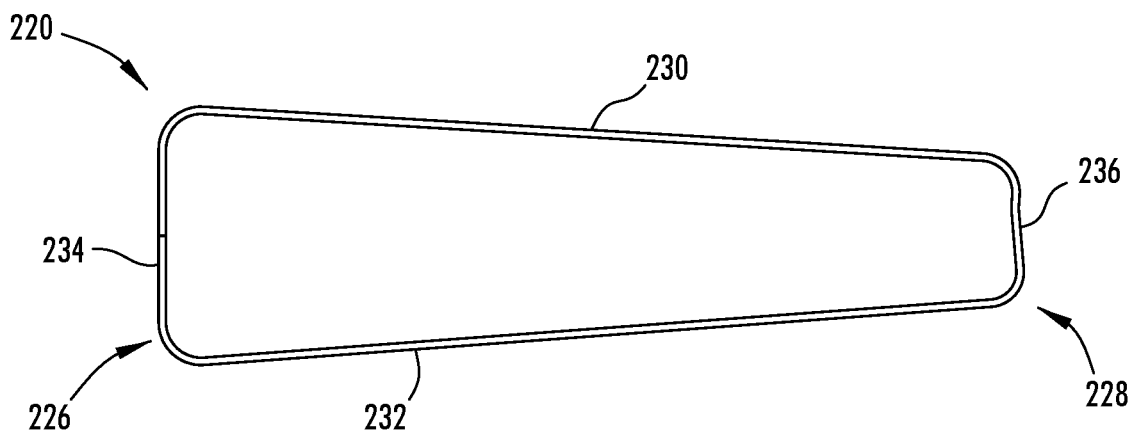
FIGS. 5-7 are cross-sectional views of examples of a rocker insert.
Figure 6:
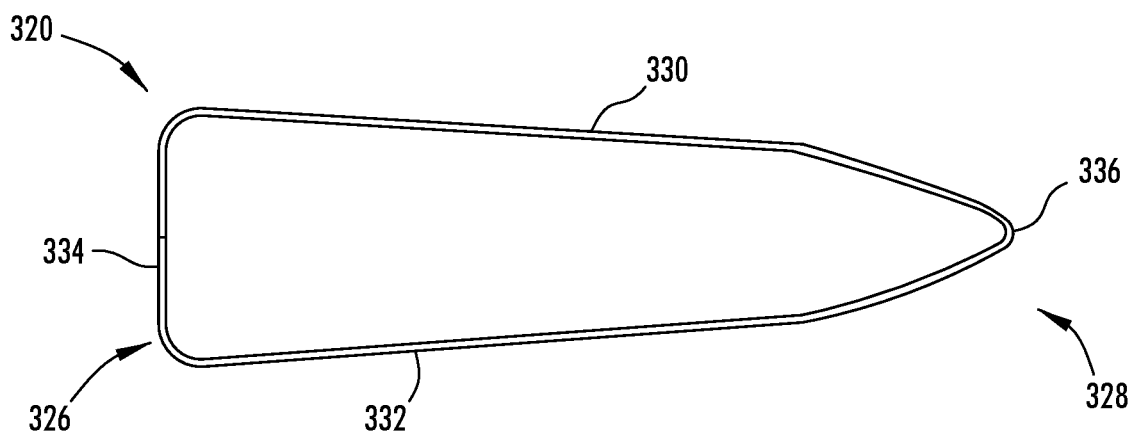
Figure 7:
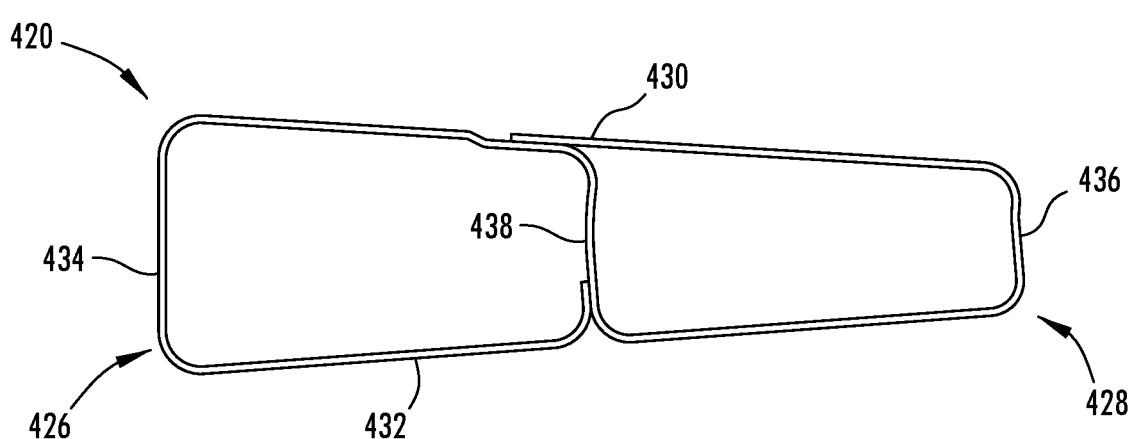

Referring to FIGS. 5-7, additional exemplary rocker inserts 220, 320, 420 are shown having a tapered shape. The rocker inserts 220, 320, 420 each includes a tubular beam that is configured to be disposed in the hollow space between inner and outer sill members. The tubular beam has a transverse cross-sectional shape that extends continuously along a length of the tubular beam, where the tapered shape is oriented with a taper from the inboard portion 226, 326, 426 to the outboard portion 228, 328, 428. As shown in FIG. 6, the upper wall 330 and the lower wall 332 each include a first planar portion and a second planar portion that is more tapered than the first planar portion and that interconnects with each other at the rounded point of the outboard wall 336. As shown in FIG. 7, the tubular beam 420 has a pair of adjacent tubular members that have hollow openings that are divided by a common center wall 438 of the tubular beam. The pair of adjacent tubular members are disposed laterally adjacent to each when spanning along the rocker assembly. In the example shown in FIGS. 5-7, a metal sheet may be formed, such as via roll forming, to provide the tubular beam 220, 320, 420.

Figure 8:
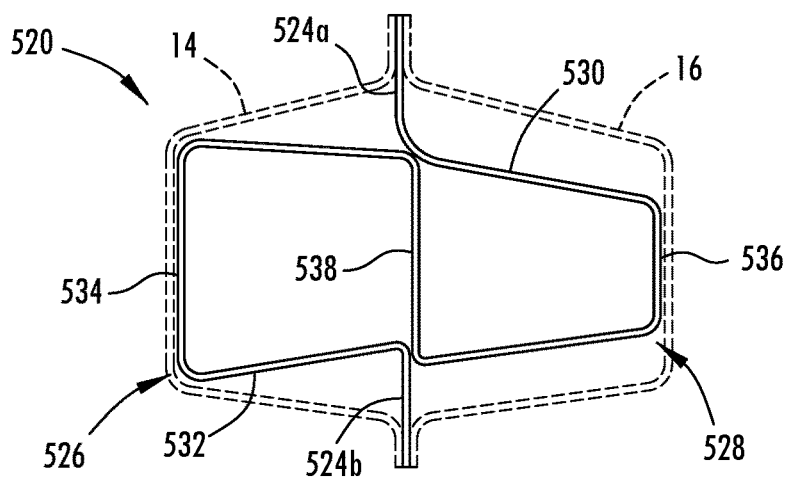
FIGS. 8-10 are cross-sectional views of examples of a rocker component.
Figure 9:
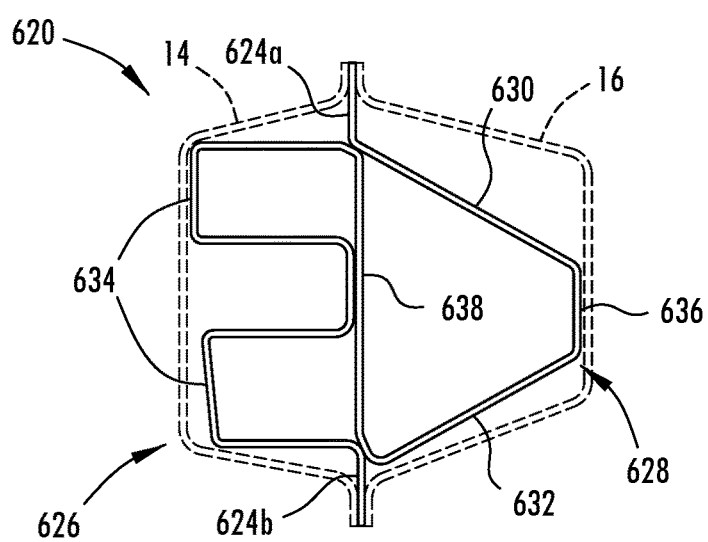
Figure 10:
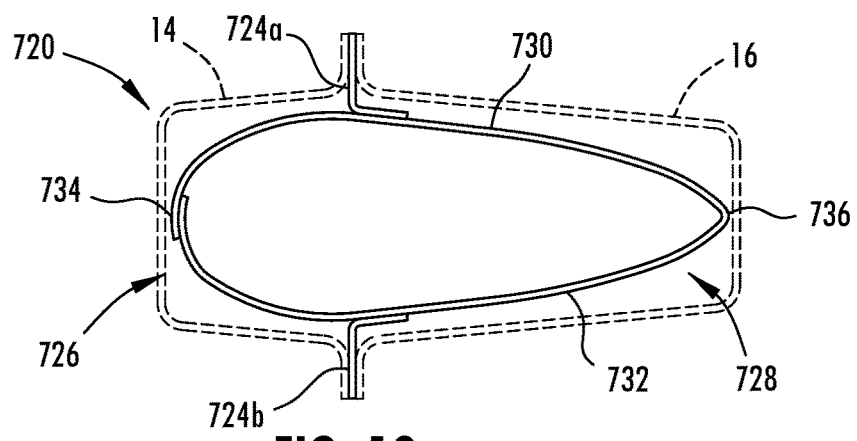
Figure 11:
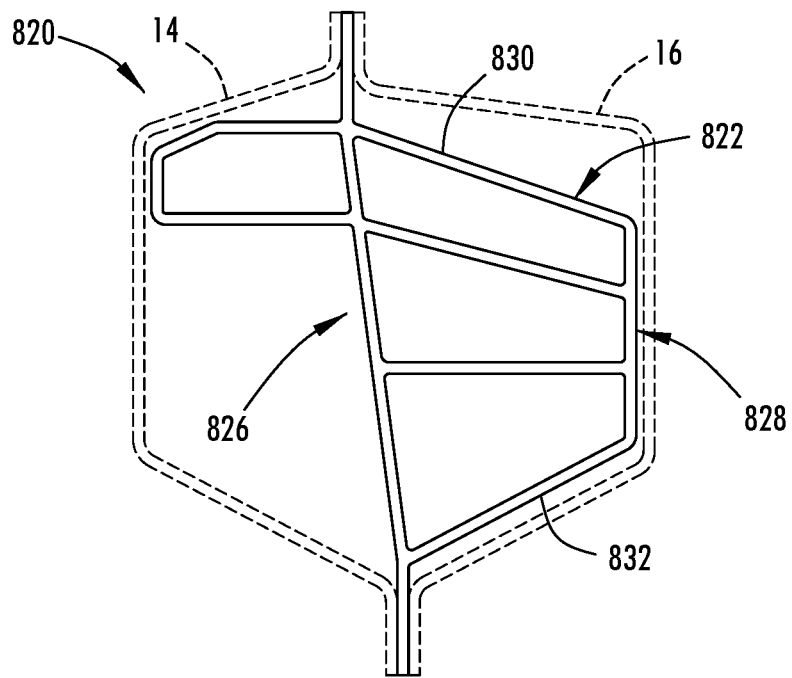
FIGS. 11-14 are cross-sectional views of examples of a rocker insert.
Figure 12:
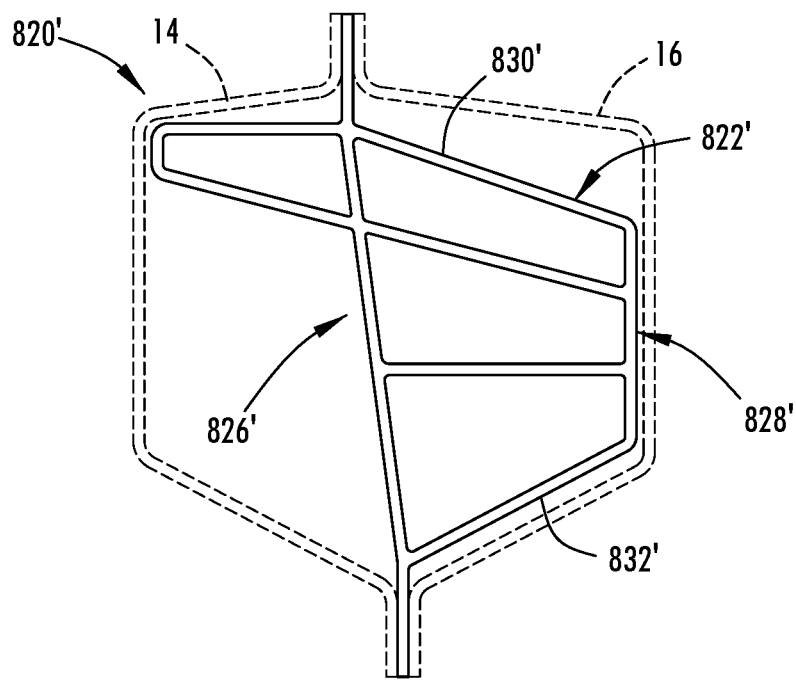
Figure 13:
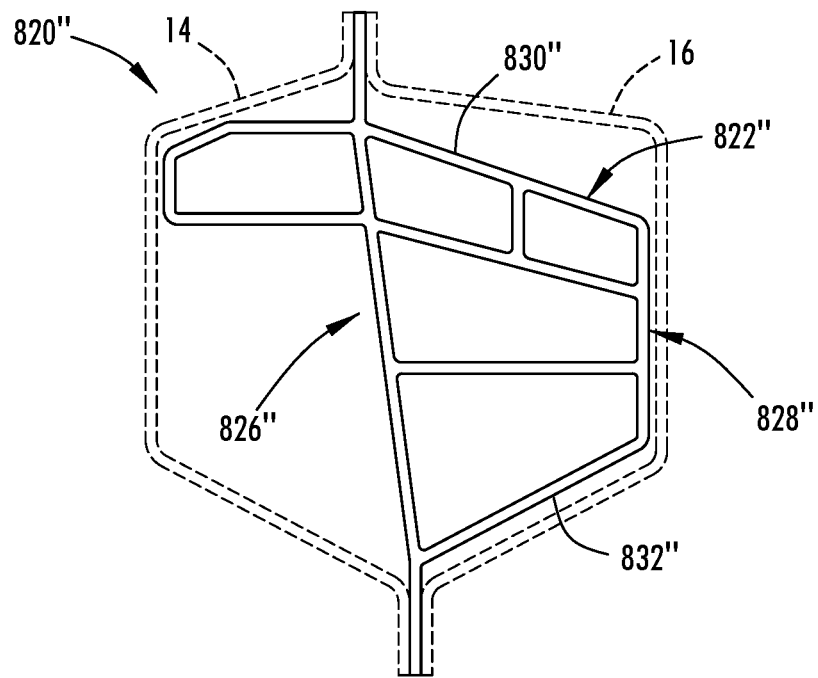
Figure 14:
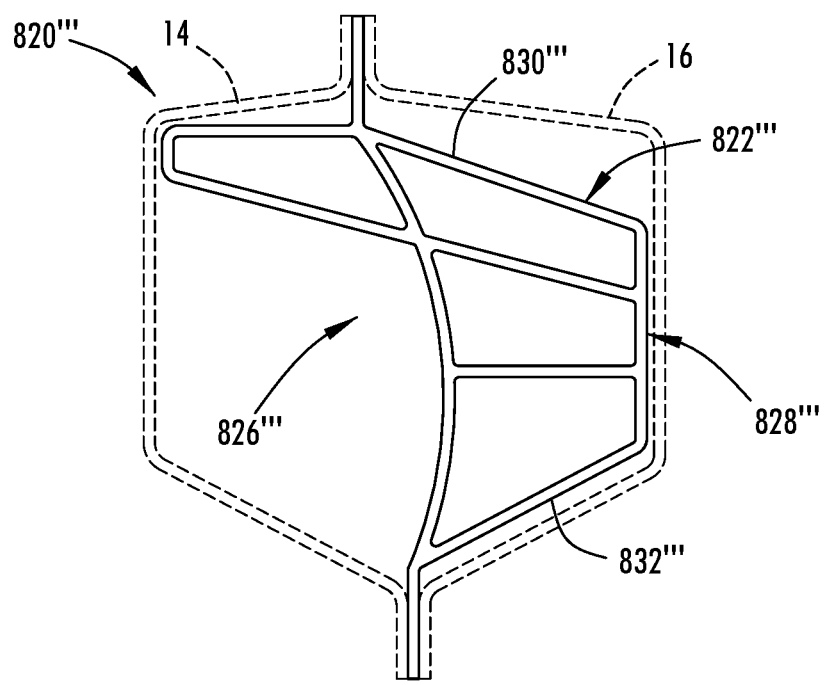

Similarly, in FIGS. 8-10 a metal sheet is formed to provide tubular beams 520, 620, 720 having a cross-sectional shape with a tapered shape at least at the outboard portion 528, 628, 728 of the rocker insert. As shown in FIGS. 8 and 9, the metal sheet is also used to form integral brackets 524a, 524b, 624a, 624b at opposing ends of the sheet. The brackets are secured between the inner and outer sill members 14, 16, such as to one of the flanges or between the flanges of the inner or outer sill members. As shown in FIG. 10, the rocker insert 720 has a tapered cross-sectional shape with rounded outboard and inboard portions 726, 728, where the tubular beam is secured in the hollow area between the inner and outer sill panels 14, 16 with upper and lower brackets 724a, 724b.

Referring now to FIGS. 11-14, rocker inserts 820-820''' are shown as a multi-tubular beam 822-822' provided by an extruded profile that has a tapered shaped at least at the outboard portion 828-828' of the beam, such as outboard from the integrated brackets that secure the rocker insert between the inner and outer sill panels 14, 16. The transverse cross-sectional shape of the beam 822-822' extends continuously along a length of the tubular beam. The inboard portion 826-826' has an inboard height dimension and the outboard portion 828-828' has an outboard height dimension that is less than the inboard height dimension. The cross-sectional shape also includes an upper planar wall 830-830''' and a lower planar wall 832-832' that connect linearly between the respective upper and lower ends of the inboard portion and the outboard portion to form a tapered shape. As shown in FIGS. 11-14, ab inboard extension protrudes inboard from the inboard portion 826 and includes a mating surface for engaging the inner sill member of the rocker assembly.

It is contemplated that the reinforcement insert of the disclosed rocker assembly may be integrated with one or both of the sill members, such that the insert may be an integral component of one or both of the sill. For example, the insert include sufficient mating structure to allow one or both of the sill members to be omitted, whereby the insert may by referred to as a rocker component.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

Also for purposes of this disclosure, the terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A rocker component for a vehicle, the rocker component comprising:
   a tubular beam integrally formed as a single metal piece, the tubular beam having a transverse cross-sectional shape extending continuously along a length of the tubular beam;
   wherein the tubular beam comprises a metal sheet formed to have a pair of adjacent tubular members that have hollow openings that are divided by a common center wall of the tubular beam;
   wherein the transverse cross-sectional shape of the tubular beam comprises an inboard portion having an inboard height dimension and an outboard portion having an outboard height dimension that is less than the inboard height dimension; and
   wherein the transverse cross-sectional shape of the tubular beam comprises an upper wall and a lower wall that connect between the respective upper and lower ends of the inboard portion and the outboard portion to form a tapered shape.

2. The rocker component of claim 1, further comprising:
   a sill inner; and
   a sill outer coupled along the sill inner, wherein the tubular beam is disposed in an open volume between the sill inner and the sill outer with the outboard portion of the tubular beam facing the sill outer.

3. The rocker component of claim 1, wherein the inboard portion comprises an inner wall and the outboard portion comprises an outer wall, and wherein the inner and outer walls integrally connect between the upper and lower walls.

4. The rocker component of claim 3, wherein the inner and outer walls and the upper and lower walls together surround at least one tubular section that extends along the length of the tubular beam.

5. The rocker component of claim 4, wherein the inner wall comprises a planar section that is disposed at a transition angle of 45 to 90 degrees relative to the upper and lower walls.

6. The rocker component of claim 4, wherein the tubular beam comprises a common center wall that extends between the upper and lower walls and divides an interior volume of the tubular beam to form at least two tubular sections.

7. The rocker component of claim 1, wherein the pair of adjacent tubular members are disposed laterally adjacent to each other.

8. The rocker component of claim 1, wherein the metal sheet comprises a martensitic steel with a tensile strength of at least 1,500 MPa.

9. A rocker insert comprising:
   a tubular beam having a transverse cross-sectional shape extending continuously along a length of the tubular beam;
   wherein the tubular beam comprises a metal sheet formed to have adjacent tubular members that have hollow openings that are divided by a common wall;
   wherein the transverse cross-sectional shape of the tubular beam comprises an inboard portion having an inboard height dimension and an outboard portion having an outboard height dimension that is less than the inboard height dimension; and
   wherein the transverse cross-sectional shape of the tubular beam comprises an upper wall and a lower wall that integrally connect between the respective upper and lower ends of the inboard portion and the outboard portion to form a tapered shape.

10. The rocker insert of claim 9, wherein the inboard portion comprises an inner wall and the outboard portion comprises an outer wall, and wherein the inner and outer walls integrally connect between the upper and lower walls.

11. The rocker insert of claim 9, wherein the upper and lower walls each comprise a planar section that angle toward the outboard portion.

12. The rocker insert of claim 11, wherein the inner and outer walls and the upper and lower walls together surround at least one tubular section that extends along the length of the tubular beam.

13. The rocker insert of claim 12, wherein the inner wall is disposed at a transition angle of 45 to 90 degrees relative to the planar sections of the upper and lower walls.

14. The rocker insert of claim 12, wherein the tubular beam comprises a common center wall that integrally connects with and extends between the upper and lower walls.

15. The rocker insert of claim 9, wherein the metal sheet comprises a martensitic steel with a tensile strength of at least 1,500 MPa.

16. A rocker component for a vehicle, the rocker component comprising:
   a sill inner;
   a sill outer coupled along the sill inner; and
   a tubular beam disposed in an open volume between the sill inner and the sill outer,
   wherein the tubular beam comprises a transverse cross-sectional shape extending continuously along a length of the tubular beam;
   wherein the tubular beam comprises a metal sheet formed to have a plurality of tubular members that include hollow openings along the length of the tubular beam;
   wherein the transverse cross-sectional shape of the tubular beam comprises an inboard portion having an inboard height dimension and an outboard portion having an outboard height dimension that is less than the inboard height dimension;
   wherein the transverse cross-sectional shape of the tubular beam comprises an upper wall and a lower wall that extend between the respective upper and lower ends of the inboard portion and the outboard portion to form a tapered shape; and
   wherein the transverse cross-sectional shape comprises inner and outer walls and the upper and lower walls are integrally connected to surround at least one tubular section that extends along the length of the tubular beam.

17. The rocker component of claim 16, wherein the tubular beam comprises a common center wall that extends between the upper and lower walls and divides an interior volume of the tubular beam to form at least two tubular sections.

* * * * *